Aug. 27, 1940.    H. L. ENGELS ET AL    2,213,069
MILKING MACHINE WASHER
Filed Oct. 12, 1938
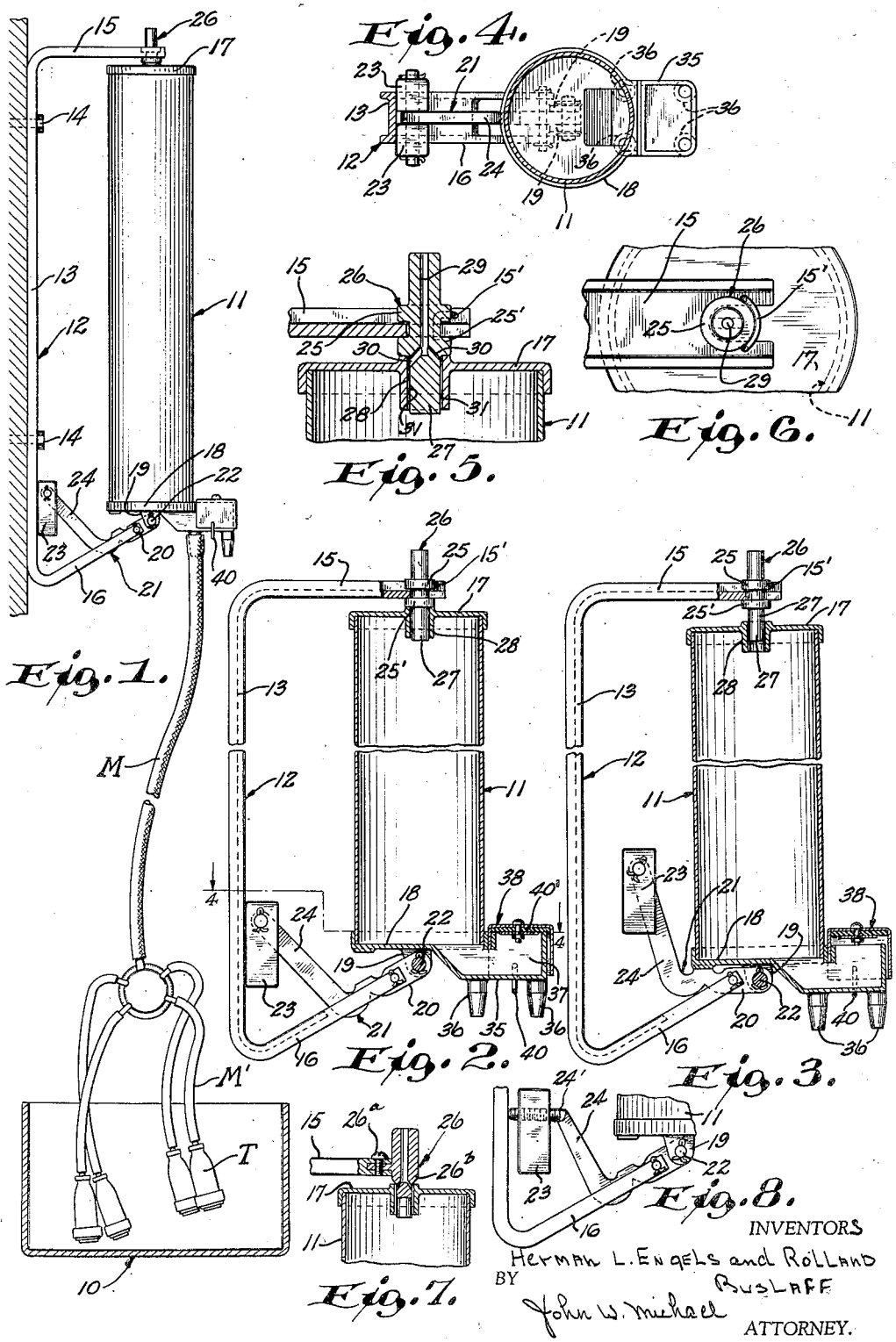
INVENTORS
Herman L. Engels and Rolland Buslaff
BY John W. Michael
ATTORNEY.

Patented Aug. 27, 1940

2,213,069

UNITED STATES PATENT OFFICE 2,213,069

MILKING MACHINE WASHER

Herman L. Engels, Marshfield, and Rolland Buslaff, Waukesha, Wis.

Application October 12, 1938, Serial No. 234,603

9 Claims. (Cl. 141—1)

This invention relates to an improvement in cleansing or washing machines especially designed and adapted for thoroughly cleaning or washing the milk tubes and teat cups of a milking machine.

One of the objects of the invention is to provide a washing machine of this character which is extremely simple and compact in construction, easy and comparatively inexpensive to manufacture, reliable and effective in operation, and capable of quickly and thoroughly flushing and cleansing the milk tubes and teat cups of a milking machine.

Another object of the invention is to provide a cleansing or washing machine of this character which is effective to cleanse not only the interior of the teat cups and milk tubes but also the exterior thereof.

A still further object is to provide a cleansing or washing machine of this character and having these advantages and which has the capacity of simultaneously cleansing and washing a plurality of milking units.

In a typical embodiment of the present invention, a receptacle containing the proper amount of cleansing fluid is disposed below a tank supported for vertical shifting movement and having one or more nipples at its lower end adapted to be interfitted with milk tubes. The milk tubes depend from the nipples and have the teat cups associated therewith submerged in the cleansing fluid in the receptacle.

The tank is biased to an elevated position and is provided at its upper end with valve means operable to establish communication between the interior of the tank and a suction line in the elevated position of the tank and to vent the interior of the tank to the atmosphere in the lowered position thereof.

With such a construction, when the tank is in its elevated position the suction exerted therein draws the cleansing fluid from the receptacle through the teat cups and milk tubes into the interior of the tank until the weight of the fluid in the tank overbalances the action of the biasing means whereupon the tank is lowered. The lowering of the tank vents its interior to the atmosphere so that the cleansing fluid therein flows by gravity back down through the milk tubes and teat cups into the receptacle. When the tank is empty the biasing means again elevates it and the cycle of operation is repeated.

Also associated with the lower end of the tank and in proper relation to the connecting nipples is a check valve controlled outlet which is closed when the tank is elevated but automatically opens when the tank is lowered to allow some of the cleansing fluid to run down along the outside of the milk tubes and thereby clean the same.

Other objects and advantages reside in certain novel features of the construction, arrangement, and combination of parts which will be hereinafter more fully described and particularly pointed out in the appended claims, reference being had to the accompanying drawing forming a part of this specification, and in which:

Figure 1 is a view partly in side elevation and partly in transverse vertical cross section showing a cleansing or washing machine embodying the present invention and illustrating it associated with the milk tubes and teat cups to be cleansed or washed;

Figure 2 is a view partly in side elevation and partly in transverse vertical cross section illustrating the tank, its supporting means, valve means, and biasing means, and showing the tank in elevated position;

Figure 3 is a view similar to Figure 2 but illustrating the tank in its lower position;

Figure 4 is a view in horizontal cross section taken on line 4—4 of Figure 2;

Figure 5 is a fragmentary view in transverse vertical cross section showing the structure of the valve means on an enlarged scale;

Figure 6 is a fragmentary view in top plan showing the valve means and the manner in which it is interrelated with the support for the tank.

Figure 7 is a fragmentary view in section showing a modified way of mounting the suction and vent valve; and Figure 8 is a fragmentary view in elevation showing a different way of mounting the overbalance and weight.

Referring to the drawing, and more particularly to Figure 1, it will be seen that the machine embodying the present invention comprises a receptacle designated generally at 10 and adapted to obtain a suitable quantity of cleansing liquid (not shown). The receptacle is supported on the floor of the building in which the machine is used. At a suitable distance above the receptacle a tank 11 is provided. The tank 11 is supported for vertical shifting movement by supporting means which includes a bracket 12 having a body portion 13 secured by suitable fastening devices 14 to a wall or the like. Bracket arms 15 and 16 are provided at the upper and lower ends of the body portion of the bracket.

The tank 11 preferably is in the form of a metal cylinder provided with upper and lower end heads 17 and 18. The lower end head 18 has a pair of apertured lugs 19 integral therewith and depending therefrom. An arm 20 of a bell crank lever designated generally at 21 has its outer end periphery interconnected with the lugs 19 by means of a pivot pin 22. Weights 23 are pivotally supported upon the other arm 24 of the bell crank lever 21. This arrangement provides an overbalance or biasing means for urging the tank 11 to its elevated position.

The upper arm 15 of the bracket overlies the upper end head 17 of the tank and the outer end of this arm is bifurcated to interfit with collars 25 and 25' of a suction and vent valve designated generally at 26. A spring clip 15' releasably retains the collars 25 and 25' and the bifurcated outer end of the bracket arm 15 interengaged. The valve 26 has a lower cylindrical portion 27 interfitting with a sleeve-like valve guide 28 provided in the upper end head 17 of the tank 11. The underface of the lower collar 25' and the top face of the valve guide 28 are machined so that the lower collar 25' constitutes the valve proper and the upper end of the valve guide 28 provides the valve seat. An axial opening or passage 29 extends from the upper end of the valve down to a point just past the center thereof and below the lower collar 25', at which point the passage 29 branches as indicated at 30, the branches communicating with longitudinally extending peripheral grooves 31 which extend down through the lower end of the valve. The upper end of the valve 26 is adapted to be connected to a suction line (not shown).

The lower end head 18 is provided with an integral lateral trough-like extension 35 from the floor of which a plurality of connecting nipples 36 depend. The top of this lateral extension is provided with an outlet opening 37 with which a check valve 38 coacts, the check valve being in the form of an inverted U-shaped metal cap equipped on the underside of its body portion with a valve facing 40'. The valve 38 seats under the action of its weight and the suction and is opened by the hydrostatic head of the liquid in the tank when the tank is vented to the atmosphere. A bail-like wire stop 40 of generally U-shape has its legs releasably connected to the sides of the valve 36 and its body portion extending under the lateral extension 35 to limit the opening movement of the valve 36.

In using the machine the main milk tube M of a milk unit is connected up to one of the nipples 36, as shown in Figure 1, or in any suitable way. If all of the nipples are not used, the ones not in operation are capped or plugged. The teat cups T carried at the lower ends of the milk tube branches M' are submerged in the cleansing fluid in the tank 10. The upper end of the valve 26 is of course, connected to the suction line (not shown). With the tank 11 empty it assumes the elevated position shown in Figures 1 and 2 under the action of the weights 23 and with the suction applied the cleansing liquid is pulled up through the teat cups through the branches M' and main tube M into the tank. When a predetermined amount of cleansing liquid is accumulated in the tank 11 the weight of the liquid overbalances the weights 23 and the tank 11 lowers from the position shown in Figure 2 to the position shown in Figure 3. This pulls the branch passages 30 of the valve 26 up above the valve seat at the top of the valve guide 28 so that the suction is exerted to the atmosphere and the interior of the tank is vented to the atmosphere through the grooves 31. The liquid now flows by gravity back down through the main milk tubes M, branch tubes M' and teat cups T into the receptacle 10 and some of it flows out past the check valve 38 and down on the outside of the main milk tube M and over the fitting on the end of this main milk tube M, if one is employed. When the tank 11 is emptied, the weight 23 returns it from the position shown in Figure 3 to the position shown in Figure 2 and the operation is repeated.

As illustrated in Figure 8, the weight 23 instead of being pivotally mounted on the arm 24 of the bell crank lever may have a threaded opening therein which interengages with the threaded stud 24' integral with the upper end of the arm 24. The threaded engagement of the weight with the stud makes it practical to adjust the weight and hence vary the lever arm through which it acts. Moreover, by having the weight rigidly connected with the bell crank in any of its adjustments it acts with increased mechanical advantage in the lowered position of the tank since it is then angled outwardly.

The present invention also contemplates a modification of the vent valve 26. As illustrated in Figure 7, the vent valve 26 may be rigidly attached as at 26a to the bracket arm 15 and it also may have a beveled valve face 26b for engagement with the valve seat.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A washing machine of the character described for cleaning the milk tubes and teat cups of a milking machine and of the type wherein the teat cups are submerged in the cleansing liquid and comprising a tank supported for vertical shifting movement, means for biasing the tank to an elevated position, valve means associated with the tank and operable to establish communication between the interior of the tank and a suction line in the elevated position of the tank and to vent the tank to the atmosphere in its lowered position, and means at the lower end of the tank adapted to be interfitted with a milk tube whereby when the tank is elevated the cleansing liquid will be drawn up through the teat cups and milk tubes into the interior of the tank until the weight of the liquid in the tank overbalances the biasing means whereupon the tank will lower and the liquid flow back through the tube and cup until the tank is empty and is again elevated and the cycle of operation repeated.

2. A washing machine of the character described for cleaning the milk tubes and teat cups of a milking machine and of the type wherein the teat cups are submerged in the cleansing liquid and comprising a tank supported for vertical shifting movement, means for biasing the tank to an elevated position, valve means associated with the tank and operable to establish communication between the interior of the tank and a suction line in the elevated position of the tank and to vent the tank to the atmosphere in its lowered position, and means at the lower end of the tank and adapted to be interfitted with a milk tube whereby when the tank is elevated the cleansing liquid will be drawn up through the teat cups and milk tubes into the interior of the tank until the weight of the liquid in the tank overbalances the biasing means whereupon the tank will lower and the liquid flow back through the tube and cup until the tank is empty and is again elevated and the cycle of operation repeated, the lower end of the tank also having a check valve controlled outlet so related to the milk tube connected to the means at the lower end of the tank that some of the cleansing liquid will flow out through the outlet and down over the outside of the milk tube when the tank is emptying, said check valve being closed under the action of the suction when liquid is being drawn into the tank.

3. A washing machine of the character described for cleansing the milk tubes and teat cups of a milking machine and of the type wherein the teat cups are submerged in a cleansing liquid, and comprising a tank, means supporting the tank for shifting movement, means for biasing the tank to one position, valve means associated with the tank and operable to establish communication between the interior of the tank and a suction line in one position of the tank and to vent the interior of the tank to the atmosphere in another position thereof, and connecting means at the lower end of the tank adapted to be interconnected with the milk tube whereby when the tank is biased to one of its positions the cleansing liquid will be drawn through the teat cup and milk tube into the tank until the weight of the liquid in the tank overbalances the action of the biasing means and shifts the tank to its other position whereupon the liquid will flow back through the tube and cup until the tank is empty and again shifted under the influence of its biasing means so that the cycle of operation will be repeated.

4. A washing machine of the character described for cleansing the milk tubes and teat cups of a milking machine and of the type wherein the teat cups are submerged in a cleansing liquid, and comprising a tank, means supporting the tank for shifting movement, means for biasing the tank to one position, valve means associated with the tank and operable to establish communication between the interior of the tank and a suction line in one position of the tank and to vent the interior of the tank to the atmosphere in another position thereof, and connecting means at the lower end of the tank adapted to be interconnected with the milk tube whereby when the tank is biased to one of its positions the cleansing liquid will be drawn through the teat cup and milk tube into the tank until the weight of the liquid in the tank overbalances the action of the biasing means and shifts the tank to its other position whereupon the liquid will flow back through the tube and cup until the tank is empty and again shifted under the influence of its biasing means so that the cycle of operation will be repeated, and a check valve controlled outlet adjacent said connecting means whereby when the tank is emptied some of the liquid will flow through said outlet down over the nipple and the outside of the milk tube.

5. A washing machine of the character described for cleansing the milk tubes and teat cups of a milking machine and of the type wherein the teat cups are submerged in a cleansing liquid and comprising a tank having upper and lower end heads, the upper end head having a valve guide and seat, the lower end head having a connecting nipple extending therefrom adapted to be connected to a milk tube, a supporting bracket having upper and lower arms, a bell crank lever fulcrumed on the lower bracket arm and having an arm interconnected with the lower end head, a weight suspended on the other arm of the bell crank lever for biasing said interconnected arm and head to elevated position, a valve secured to the upper bracket arm and cooperable with said valve guide and seat, and having passages and grooves effective to vent the interior of the tank to the atmosphere in the lowered position thereof and to establish communication between the interior of the tank and a suction line in the elevated position thereof whereby when the tank is elevated liquid will be drawn through the teat cups and milk tube into the interior of the tank until the weight of the liquid overbalances the weight of the bell crank lever and lowers the tank to vent it to the atmosphere and allow the liquid to flow by gravity back through the milk tube and teat cups until the tank is empty and is again elevated and the cycle of operation is again repeated.

6. A washing machine of the character described for cleansing the milk tubes and teat cups of a milking machine and of the type wherein the teat cups are submerged in a cleansing liquid and comprising a tank having upper and lower end heads, the upper end head having a valve guide and seat, the lower end head having a connecting nipple extending therefrom, a supporting bracket having upper and lower arms, a bell crank lever fulcrumed on the lower bracket arm and having an arm interconnected with the lower end head, a weight suspended on the other arm of the bell crank lever for biasing said interconnected arm and head to elevated position, a valve secured to the upper bracket arm and cooperable with said valve guide and seat, and having passages and grooves effective to vent the interior of the tank to the atmosphere in the lowered position thereof and to establish communication between the interior of the tank and a suction line in the elevated position thereof whereby when the tank is elevated liquid will be drawn through the teat cups and main tubes into the interior of the tank until the weight of the liquid overbalances the weights on the bell crank lever and lowers the tank to vent it to the atmosphere and allow the liquid to flow by gravity back through the milk tubes and teat cups until the tank is empty and is again elevated and the cycle of operation is again repeated, and a valve controlled outlet associated with the lower end head and so related to the nipple that when the tank is emptying some of the liquid will flow through the outlet around the nipple and down the outside of the milk tube.

7. A washing machine of the character described for cleaning the milk tubes and teat cups of a milking machine and of the type wherein the teat cups are submerged in a cleansing liquid contained in a receptacle and comprising a cylinder, means providing for the permanent support of the cylinder above the receptacle containing the cleansing liquid, means at the lower end of the cylinder adapted to be interfitted with the milk tubes to establish communication between the milk tubes and the interior of the cylinder, and means for creating a suction within the cylinder to cause the cleansing liquid to be drawn up through the teat cups and the milk tubes into the interior of the cylinder while providing for the relief of the suction in the cylinder and the return flow of the cleansing liquid from the cylinder back through the tubes and cups to the receptacle after a predetermined amount of the cleansing liquid has been drawn up into the cylinder.

8. A washing machine of the character described for cleaning the milk tubes and teat cups of a milking machine and of the type wherein the teat cups are submerged in the cleansing liquid, and comprising a tank supported above the teat cups, means at the lower end of the tank adapted to be interfitted with the milk tubes, and means for causing the cleansing liquid first to be drawn up through the teat cups and milk tubes into the interior of the tank and then for reversing flow of the cleansing liquid and causing it to flow back through the milk tubes and teat cups and including a suction line having a valve-controlled connection with the interior of the tank.

9. A washing machine of the character described for cleaning the milk tubes and teat cups of a milking machine and of the type wherein the teat cups are submerged in the cleansing liquid, and comprising a tank supported above the teat cups, means at the lower end of the tank adapted to be interfitted with the milk tubes, and means for causing the cleansing liquid first to be drawn up through the teat cups and milk tubes into the interior of the tank and then for reversing flow of the cleansing liquid and causing it to flow back through the milk tubes and teat cups and including a suction line having a valve-controlled connection with the interior of the tank, said valve-controlled connection including a valve having a passage connected to the suction line, said passage having branches adapted to be brought into communication with the interior of the tank so as to apply the vacuum in a diffused fashion to the interior of the tank.

HERMAN L. ENGELS.
ROLLAND BUSLAFF.